US006816884B1

(12) United States Patent
Summers

(10) Patent No.: US 6,816,884 B1
(45) Date of Patent: Nov. 9, 2004

(54) SYSTEM AND METHOD FOR CREATING CONVERSATIONALLY-STYLED SUMMARIES FROM DIGESTING EMAIL MESSAGES

(76) Inventor: Colin T. Summers, 344 Bonhill Rd., Los Angeles, CA (US) 90049

( * ) Notice: Subject to any disclaimer, the term of this patent is extended or adjusted under 35 U.S.C. 154(b) by 0 days.

(21) Appl. No.: 09/492,943

(22) Filed: Jan. 27, 2000

(51) Int. Cl.[7] .............................................. G06F 15/16
(52) U.S. Cl. ...................... 709/206; 709/202; 709/203; 709/205; 709/228; 709/245
(58) Field of Search ................................ 709/200–207, 709/227–228, 237–238, 244–245; 358/402–403

(56) References Cited

U.S. PATENT DOCUMENTS

| | | | |
|---|---|---|---|
| 5,493,692 A | * 2/1996 | Theimer et al. | ............ 709/206 |
| 5,632,018 A | 5/1997 | Otorii | ........................ 709/206 |
| 5,751,960 A | 5/1998 | Matsunaga | ................... 709/206 |
| 5,864,684 A | 1/1999 | Nielsen | ....................... 709/206 |
| 5,872,925 A | 2/1999 | Han | ........................... 709/206 |
| 6,211,972 B1 | * 4/2001 | Okutomi et al. | ............ 358/402 |
| 6,289,372 B1 | * 9/2001 | Vyaznikov | ................... 709/206 |
| 6,480,885 B1 | * 11/2002 | Olivier | ....................... 709/207 |
| 6,519,629 B2 | * 2/2003 | Harvey et al. | .............. 709/204 |

* cited by examiner

Primary Examiner—Bharat Barot
(74) Attorney, Agent, or Firm—Jeffer, Mangels, Butler & Marmaro LLP

(57) ABSTRACT

A computer system and method is provided for selective filtering of incoming email messages, divesting the messages of unnecessary information and digesting the messages to provide a desired message format, such as a conversational text. The method and system enables an email user to specify a desired format and frequency for receiving email message digests from a discussion group. The email messages are digested to have a feeling of a group conversation that takes place in email. The group members can collect, read, and reply to the messages at their convenience and using their preferred format.

36 Claims, 14 Drawing Sheets

| | | |
|---|---|---|
| coast@tightcircle.com | ussenatormass@senate.gov | Ted |
| coast@tightcircle.com | carolyn@schlossberg.com | Carolyn |
| coast@tightcircle.com | john@brown.edu | John |
| coast@tightcircle.com | edwin@schlossberg.com | Ed |

FIG. 5A

```
From john@brown.edu
Received: from power.net (mail.power.net [204.140.165.2])
       by feathers.tightcircle.com (8.9.3/8.9.3) with SMTP id UAA25060
       for <coast@tightcircle.com>; Sun, 14 Nov 1999 20:16:58 -0800
Message-Id: <199911150416.UAA25060@feathers.tightcircle.com>
Received: (qmail 21999 invoked from network); 15 Nov 1999 04:17:00 -0000
Received: from dsl-46-96.power.net (HELO ?192.168.254.26?) (207.151.46.96)
    by mail.power.net with SMTP; 15 Nov 1999 04:17:00 -0000
Received: from tetsuo.mspring.net (tetsuo.mspring.net [207.69.231.11])
       by feathers.tightcircle.com (8.9.3/8.9.3) with ESMTP id UAA25047
       for <coast@tightcircle.com>; Sun, 14 Nov 1999 20:15:44 -0800
Received: from mtiwmhc01.worldnet.att.net (mtiwmhc01.worldnet.att.net
[204.127.131.36])
       by tetsuo.mspring.net (8.8.8/8.8.6) with ESMTP id XAA04209
       for <coast@tightcircle.com>; Sun, 14 Nov 1999 23:15:40 -0500 (EST)
Received: from compaq ([12.79.52.227]) by mtiwmhc01.worldnet.att.net
          (InterMail v03.02.07.07 118-134) with SMTP
          id <19991115041541.TYEY26289@compaq>
          for <colin@mightycheese.com>; Mon, 15 Nov 1999 04:15:41 +0000
References: <B4548342.5AE%colin@mightycheese.com>
MIME-Version: 1.0
Content-Type: text/plain; charset="iso-8859-1"
Content-Transfer-Encoding: 7bit
X-Mailer: Microsoft Outlook Express 5.00.2014.211
X-MimeOLE: Produced By Microsoft MimeOLE V5.00.2014.211
Date: Jun 10 1998
Subject: the trip Well, it looks like it will be smooth sailing.
> Weather report for Cape Cod
> for the week of June 10, '98
> Sun, sun and more sun.
> Light breezes.
```

FIG. 5B

```
From susan@coolnews.net
Received: from power.net (mail.power.net [204.140.165.2])
        by feathers.tightcircle.com (8.9.3/8.9.3) with SMTP id UAA25060
        for <coast@tightcircle.com>; Sun, 14 Nov 1999 20:16:58 -0800
Message-Id: <199911150416.UAA25060@feathers.tightcircle.com>
Received: (qmail 21999 invoked from network); 15 Nov 1999 04:17:00 -0000
Received: from tetsuo.mspring.net (tetsuo.mspring.net [207.69.231.11])
        by feathers.tightcircle.com (8.9.3/8.9.3) with ESMTP id UAA25047
        for <coast@tightcircle.com>; Sun, 14 Nov 1999 20:15:44 -0800
Received: from mtiwmhc01.worldnet.att.net (mtiwmhc01.worldnet.att.net
[204.127.131.36])
        by tetsuo.mspring.net (8.8.8/8.8.6) with ESMTP id XAA04209
        for <coast@tightcircle.com>; Sun, 14 Nov 1999 23:15:40 -0500 (EST)
Received: from compaq ([12.79.52.227]) by mtiwmhc01.worldnet.att.net
        (InterMail v03.02.07.07 118-134) with SMTP
        id <19991115041541.TYEY26289@compaq>
        for <colin@mightycheese.com>; Mon, 15 Nov 1999 04:15:41 +0000
References: <B4548342.5AE%colin@mightycheese.com>
MIME-Version: 1.0
Content-Type: text/plain; charset="iso-8859-1"
Content-Transfer-Encoding: 7bit
X-Mailer: Microsoft Outlook Express 5.00.2014.211
X-MimeOLE: Produced By Microsoft MimeOLE V5.00.2014.211
Date: June 9, 1998
Subject: Get Rich Quick!

Here's how to become a millionare while you stay
at home. You don't even have to leave the couch.
First, get a million dollars. Then...

From ussenatormass@senate.gov
Received: from power.net (mail.power.net [204.140.165.2])
        by featherstightcircle.com (8.9.3/8.9.3) with SMTP id UAA25060
        for <coast@tightcircle.com>; Sun, 14 Nov 1999 20:16:58 -0800
Message-Id: <199911150416.UAA25060@feathers.tightcircle.com>
Received: (qmail 21999 invoked from network); 15 Nov 1999 04:17:00 -0000
Received: from dsl-46-96.power.net (HELO ?192.168.254.26?) (207.151.46.96)
  by mail.power.net with SMTP; 15 Nov 1999 04:17:00 -0000
Received: from mtiwmhc01.worldnet.att.net (mtiwmhc01.worldnet.att.net
[204.127.131.36])
        by tetsuo.mspring.net (8.8.8/8.8.6) with ESMTP id XAA04209
        for <coast@tightcircle.com>; Sun, 14 Nov 1999 23:15:40 -0500 (EST)
Received: from compaq ([12.79.52.227]) by mtiwmhc01.worldnet.att.net
        (InterMail v03.02.07.07 118-134) with SMTP
        id <19991115041541.TYEY26289@compaq>
        for <colin@mightycheese.com>; Mon, 15 Nov 1999 04:15:41 +0000
References: <B4548342.5AE%colin@mightycheese.com>
MIME-Version: 1.0
Content-Type: text/plain; charset="iso-8859-1"
Content-Transfer-Encoding: 7bit
X-Mailer: Microsoft Outlook Express 5.00.2014.211
X-MimeOLE: Produced By Microsoft MimeOLE V5.00.2014.211
Date: June 11, 1998
Subject: weekends Sorry, kids, I can't make it. I'm in a filibuster.

```
From ap@flying.org
Received: from power.net (mail.power.net [204.140.165.2])
      by feathers.tightcircle.com (8.9.3/8.9.3) with SMTP id UAA25060
      for <coast@tightcircle.com>; Sun, 14 Nov 1999 20:16:58 -0800
Message-Id: <199911150416.UAA25060@feathers.tightcircle.com>
Received: (qmail 21999 invoked from network); 15 Nov 1999 04:17:00 -0000
Received: from mtiwmhc01.worldnet.att.net (mtiwmhc01.worldnet.att.net
[204.127.131.36])
      by tetsuo.mspring.net (8.8.8/8.8.6) with ESMTP id XAA04209
      for <coast@tightcircle.com>; Sun, 14 Nov 1999 23:15:40 -0500 (EST)
Received: from compaq ([12.79.52.227]) by mtiwmhc01.worldnet.att.net
         (InterMail v03.02.07.07 118-134) with SMTP
         id <19991115041541.TYEY26289@compaq>
         for <colin@mightycheese.com>; Mon, 15 Nov 1999 04:15:41 +0000
References: <B4548342.5AE%colin@mightycheese.com>
MIME-Version: 1.0
Content-Type: text/plain; charset="iso-8859-1"
Content-Transfer-Encoding: 7bit
X-Mailer: Microsoft Outlook Express 5.00.2014.211
X-MimeOLE: Produced By Microsoft MimeOLE V5.00.2014.211
Date: June 12, 1998
Subject: Be a bird!

Get a pilot's license! Every man's dream is to fly, and
now you can learn how. Our easy work-at-home course
is easier to pass that the bar exam, and even better for
impressing girls...

From carolyn@schlossberg.com
Received: from power.net (mail.power.net [204.140.165.2])
      by feathers.tightcircle.com (8.9.3/8.9.3) with SMTP id UAA25060
      for <coast@tightcircle.com>; Sun, 14 Nov 1999 20:16:58 -0800
Message-Id: <199911150416.UAA25060@feathers.tightcircle.com>
Received: (qmail 21999 invoked from network); 15 Nov 1999 04:17:00 -0000
Received: from dsl-46-96.power.net (HELO ?192.168.254.26?) (207.151.46.96)
   by mail.power.net with SMTP; 15 Nov 1999 04:17:00 -0000
Received: from compaq ([12.79.52.227]) by mtiwmhc01.worldnet.att.net
         (InterMail v03.02.07.07 118-134) with SMTP
         id <19991115041541.TYEY26289@compaq>
         for <coast@tightcircle.com>; Mon, 15 Nov 1999 04:15:41 +0000
References: <B4548342.5AE%colin@mightycheese.com>
MIME-Version: 1.0
Content-Type: text/plain; charset="iso-8859-1"
Content-Transfer-Encoding: 7bit
X-Mailer: Microsoft Outlook Express 5.00.2014.211
X-MimeOLE: Produced By Microsoft MimeOLE V5.00.2014.211
Date: June 13, 1998
Subject: Traffic John, please drive up with us. Sorry you can't make it,
Uncle Ted. The kids are excited to be on the water and
they will miss you.

Sincerely,
Carolyn K. S.
Schlossberg Inc.
Sixth Avenue
New York, NY 10018
```

FIG. 5D

```
a digest of coast at tightcircle
January 15, 2000

Well, it looks like it will be smooth sailing.
                                    -- John Sorry, kids, I can't make it. I'm in a filibuster.
                                    -- Ted John, please drive up with us. Sorry you can't make it, Uncle Ted.
The kids are excited to be on the water and they will miss you.

-- Carolyn digest complete
```

FIG. 5E

| step | 1 | 2 | 3 | 4 | the
East Coast —— 80
tightcircle click on the name of the tightcircle to return to its home page Colin, we have create the "East Coast" tightcircle.

what's ahead?

The remaining three steps are very simple.

On the next page we will find out how you want to administer your new tightcircle, and then you need to tell us who you want to invite to join it.

On this page you can change the email address we have assigned to your tightcircle (eastcoast@tightcircle.com). —— 85
If you like the address, just click continue.

[continue]
84 vanity address

We have assigned the following email address to your tightcircle, but you can request a different one. We will assign it to your tightcircle if it is available.

[coast]          @tightcircle.com
         81

[request]
83 some moderation...

The "East Coast" tightcircle can be moderated, means that all messages which come in from the members are redirected directly to you. You will then have the chance to forward them into the digest, under the member's name, or just discard them if they are off-topic or repetitive.

Most tightcircles do not need to be moderated, and you can turn it on later.

☐ moderated
82

FIG. 8 three invitations to the
East Coast
tightcircle click on the name of the tightcircle to return to its home page You indicated that you wanted to invite three members to the tightcircle. On this page you will enter their information.

For each member we would like to have their first and last name and their email address. (If they decide not to join your circle, their information will be deleted from our system.) Additionally, you may wish to add a nickname for each member. (If you do not chose a nickname, the first and last name will be used.)

| | first name ⌐110 | last name ⌐111 | email address ⌐112 | nick name ⌐113 |
|---|---|---|---|---|
| 1 | T | K | ussenatormass@senate.gov | Ted |
| 2 | J | K | john@brown.edu | John |
| 3 | E | S | edwin@schlossberg.com | Ed |

114—[Invite]

tightcircle.com

SYSTEM AND METHOD FOR CREATING CONVERSATIONALLY-STYLED SUMMARIES FROM DIGESTING EMAIL MESSAGES

FIELD OF THE INVENTION

The present invention relates to managing electronic mail. Specifically, the present invention is directed to a system and method for filtering, formatting and digesting electronic mail.

BACKGROUND OF THE INVENTION

Electronic mail (email) provides a quick and convenient way for computer users to communicate. This communication is initiated by a message sender who composes the message using an email program, provides the email address of the intended recipient, and often provides an indication of the content (subject matter) of the message by providing text in a "Subject" field. The composed message is then sent to the recipient's email address. The recipient's computer receives the message and stores it in the recipient's mail inbox. The recipient can then read, delete, respond to, or otherwise process the message stored within the inbox.

A sender can address a single message to many recipients by separating the addresses of the recipients with a comma or addressing the message to a mailing list (distribution list). Each of these recipients may respond to the original message by sending a reply message to the same list of recipients or only to the author. Some of these recipients may then respond to the first reply message. These reply messages are termed follow-up messages to the original message. This process facilitates a vigorous discussion between the original sender and the recipients, as well as between the recipients. However, the reply messages include a substantial amount of unnecessary information, such as, header text, quoted information from the previous messages, signature blocks, and more.

Examples of application programs that are recipients of email for group discussion include list server system email (listservers). A listserver can receive mail addressed to the email address of a mailing list serviced by the listserver, and forward (redistributes) that received mail to the subscribers of the mailing list. A mailing list is often concerned with a particular subject matter, for example, birdlovers@sierraclub.org. The listserver also services commands contained in messages sent directly to the email address of the listserver application (as compared to messages sent to the email address of the mailing list serviced by the listserver).

"Subscribe" and "unsubscribe" command messages are typically recognized by listserver. Those interested in the subject matter of the mailing list and wanting to join the mailing list send a "subscribe" command message to the listserver controlling the mailing list. The listserver maintains a recipient database that comprises the email address of each recipient (member). The listserver indiscriminately forwards every email message sent to the email address of the mailing list to the email address of every member in the recipient database. This can result in large number of email messages in each subscriber's inbox. A member may send an "unsubscribe" command message to the listserver to remove the member's email address from the recipient database and thus stop the listserver from forwarding, to the member any subsequent messages addressed to the mailing list.

Mailing lists can be managed directly by some human agency, a listserver application, or a combination of both. Some mailing lists are moderated by a human who reviews all incoming messages prior to forwarding them to the mailing list subscribers. Other mailing lists are not moderated, and messages sent to the unmoderated group are automatically forwarded to the rest of the subscribers without any processing.

One of the problems with many mailing lists is that any person, even a non-member, can send messages directed to the mailing list resulting in unrelated messages or unwanted solicitation of the members. Another problem is that a substantial amount of unrelated and unnecessary information such as header text, quoted material, signature blocks, etc., is embedded within each message. This unrelated information unnecessarily obscures the substance of the message. Yet another problem associated with mailing lists is that members often forget which listserver manages each of the mailing lists subscribed to by the members. Many busy people will forget the lists they subscribed to, which listserver supports each list, and how to subscribe to, and unsubscribe from each list. Subscribers' needs also differ, but the current listservers do not take this into account. The present invention allows subscribers to control how often they receive digests, what format the digests take, and other options generally unavailable to each individual.

For these reasons, among others, senders and recipients of email messages need a system and a computer software to facilitate and manage their email messages to and from a discussion group. The present invention addresses these problems and simplifies a sender's and a recipient's use of discussion groups by providing mechanisms for filtering the email messages, divesting the messages of unnecessary information and digesting the messages to provide a feeling of continuity, community and a conversational text.

SUMMARY OF THE INVENTION

The present invention overcomes the disadvantages of the above described systems and provides an economical method, system, and computer program product for providing enhanced capabilities to senders and recipients of email messages. One aspect of the invention is a computer controlled method for selectively filtering email messages, divesting the messages of unnecessary information and digesting the messages to provide a desired message format, such as a conversational text.

One embodiment of the present invention is a method and system that enables an email user to specify a desired digest format for receiving email messages directed to a discussion group. The email messages are digested to have a feeling of a group conversation that takes place in email. The conversation can include more than two people at a time. Since the conversation does not happen in real rime, the community members can collect, read, and reply to the messages at their convenience and using their preferred format.

In one embodiment of the present invention, a method and system are provided for delivering digested electronic mail to members of a discussion group. Information about the members of the discussion group is stored in a database. When the system receives an email message addressed to the discussion group, it sorts through the received message to find a destination community email address. The system stores the message in an archive (in the database) for that community. Subsequently, at intervals specified by each individual member, the system gathers the member's unread messages from the archive, finds the member's email address in the members database for that community, digests the messages in the format selected by that member, and sends out the digest.

These and other features of the present invention will become readily apparent in view of the accompanying drawings and the detailed description of the embodiments.

BRIEF DESCRIPTION OF THE DRAWINGS

FIGS. 5A–5E illustrate an example of how original email messages are digested based of user provided information;

FIGS. 7–11 illustrate the steps involved in creating a discussion group for one embodiment of the present invention.

DETAILED DESCRIPTION

Figure 1:
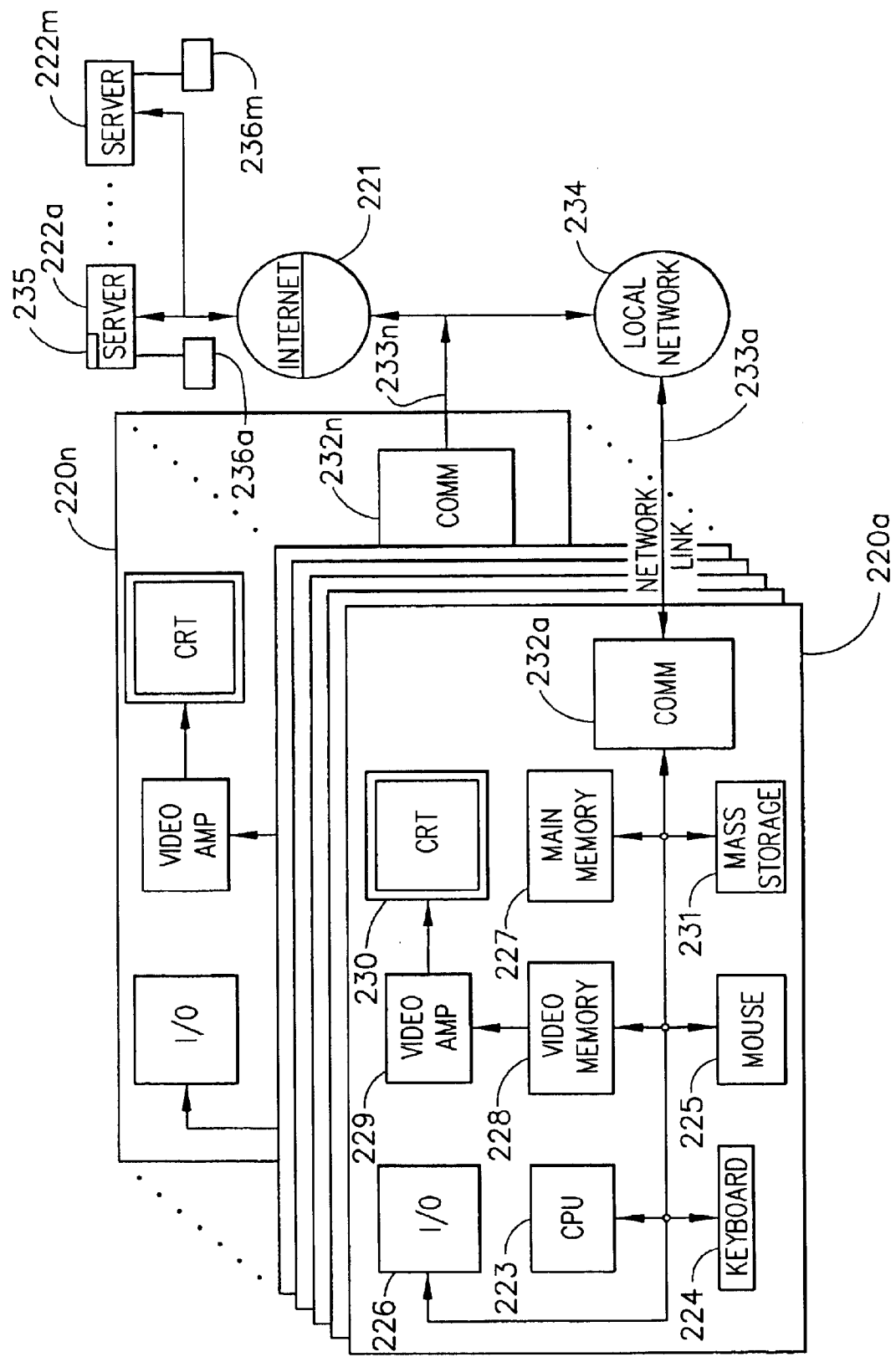
FIG. 1 is a simplified block diagram of a typical Internet environment.

The present invention generates, applies, and maintains a plurality of electronic communities for exchanging email between the members and offers a number of features to keep the discussion continuous. The system of the present invention collects, stores, and sends out digests of the email messages at regular intervals selectable by the community members. Additionally, the present invention formats the messages based on user preferences specified over Internet, by email, by visiting a web page, or by telephone calls. Additionally, all incoming messages are stored initially, not distributed. Subsequent actions (formatting, translation, filtering of the text for important data, digesting) are taken on the messages in their original form in the archive. By holding the messages before distribution, the invention significantly increases the usefulness of an email discussion group because it allows many other features to be implemented.

The Internet has recently been popularized by the rapid success of the World Wide Web (WWW or Web). The Web links together a variety of computers from around the world and various topics in a non-sequential network of associations which permit a user to browse from one topic to another, regardless of the format and order of topics. Users access and browse the Web using a web browser that generally resides and is executed on the user's computer. Commercially available web browsers such as Netscape's Navigator™ and Microsoft Internet Explorer™ are very common and accessible by personal computer (PC) users. The web browser allows a user to retrieve and render hyper-media content from the network of computers within the Web, including text, sound, video and other types of data. These hyper-media contents are stored on different web sites. Most web browsers also include an application (an email client) to allow users to send and receive email messages.

Web sites are files located on server computers that are accessible through the Internet. A variety of information, such as hyper media contents and databases can be stored on a web server and be accessed by users with computers connected to the Internet. To serve up pages, web sites need a server (a host computer) and server software that runs on the server. The host computer manages the communication protocols and stores the pages and related software required to create a web site on the Internet. These computers are spread throughout the Internet and can host many different web sites.

The Internet works based on a client/server model. In this model, a client computer communicates with a server computer on which information resides and the client computer depends on the server to deliver requested information and services. These services may involve handling incoming and outgoing email. Other examples of these services are searching for information and sending it back to the client (such as when a database on the Web is queried), and delivering web pages for a web site. Typically, the client is a PC user using a browser to connect to the servers or using an email client to send or receive email messages. The servers (also known as hosts) are usually more powerful computers that store the data and databases.

The web sites that make up the World Wide Web need to have unique locations so that a client computer can locate them to request services such as retrieving email, files, web pages, and other information. The unique identifier for a host computer is called an IP (Internet Protocol) address and the unique identifier for a web site (web page) is called the URL (Uniform Resource Locator). A URL indicates where the host computer is located, the location of the web site on the host, and the name of the web page and the file type of each document, among other information.

Home and small business users connect to the Internet through Internet service providers (ISP) using modems and common telephone or cable networks. Wireless and satellite connections are also possible. Larger businesses typically obtain access to the Internet through their private computer networks, using appropriate safeguards to prevent unauthorized access by outside parties to a company's private network.

FIG. 1 shows a block diagram of a typical Internet client/server environment used by the email senders and recipients in one embodiment of the present invention. PCs 220a–220n used by the email senders and recipients are connected to the Internet 221 through the communication links 233a–233n. Optionally, a local network 234 may serve as the connection between some of the PCs 220a–220n, such as the PC 220a and the Internet 221. Servers 222a–222m are also connected to the Internet 221 through respective communication links. Servers 222a–222m include information and databases accessible by PCs 220a–220n. In one embodiment of the present invention, a computer program for facilitating and managing discussion groups resides on at least one of the servers 222a–222m and is accessible by the email senders and recipients using one or more of the PCs 220a–220n.

In one embodiment of the present invention, each of the PCs 220a–220n typically includes a central processing unit (CPU) 223 for processing and managing data; and a keyboard 224 and a mouse 225 for inputting data. A main memory 227 such as a Random Access Memory (RAM), a video memory 228 for storing image data, and a mass storage device 231 such as a hard disk for storing data and programs are also included in a typical PC. Video data from the video memory 228 is displayed on the CRT 230 by the video amplifier 229 under the control of the CPU 223. A communication device 232, such as a modem, provides access to the Internet 221. Optionally, one or more of PCs 220a–220n may be connected to a local network 234. An Input/Output (I/O) device 226 reads data from various data sources and outputs data to various data destinations.

Figure 2:
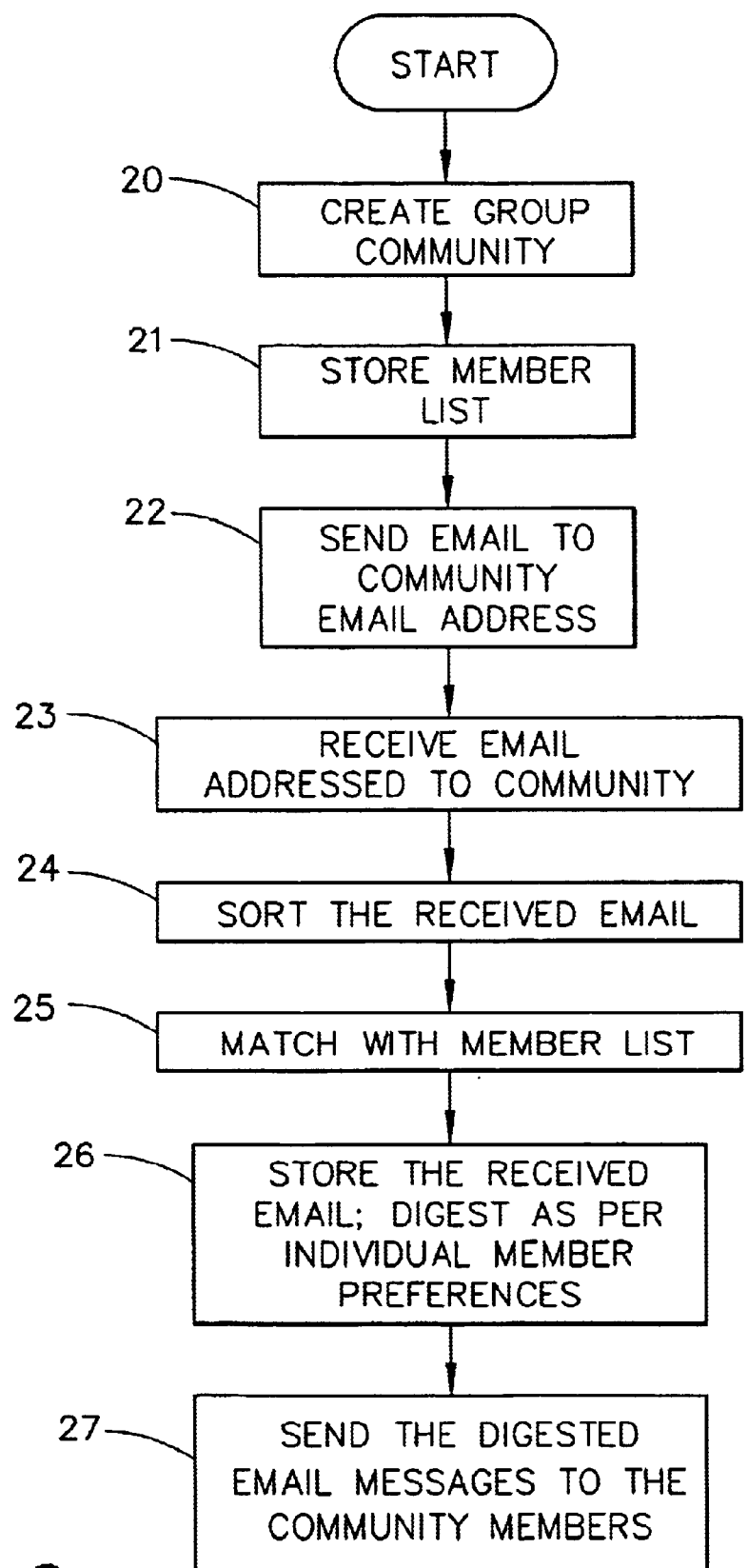
FIG. 2 is an exemplary flow diagram for a computer program according to one embodiment of the present invention.

Servers (hosts) 222a–222m are also computers and typically have architecture similar to the architecture of PCs 220a–220n. Generally, servers differ from the PCs in that servers can handle multiple telecommunications connections at one time. Usually, servers have more storage and memory capabilities, and higher speed processors. Some servers (hosts) may actually be several computers linked together, with each handling incoming web page requests. In one embodiment, each server 222a–222m has a storage medium 236a–236m, such as a hard disk, a CD drive, and the like for loading computer software. When a software such as the software responsible for executing the processes in FIG. 2 is loaded on the server 222a, an off-the-shelf web management software or load balancing software may distribute the different modules of the software to different servers 222a–222m. Therefore, in one embodiment, the computer program responsible for executing the present invention resides on one or more servers.

An exemplary web site location 235 is shown on server 222a in FIG. 1. In one embodiment of the present invention, the group community is created by accessing web site 235 as described below in more detail. The web site 235 has a unique address that is used by the users to access server 222a (in this example) and the web site location on the server 222a. The computer software for executing the steps of the present invention may also reside on the web site 235.

Email is one of the most heavily used features of the Internet. Email can be used to send messages to anyone who is connected to the Internet or connected to a computer network that has a connection to the Internet. Millions of people send and receive email every day. Email messages are sent in the same way as most Internet data. The Transmission Control Protocol (TCP) breaks the email messages into packets, the Internet Protocol (IP) delivers the packets to the proper location, and then, the TCP reassembles the message on the receiving end so that it can be read.

An email message is made up of binary data, usually in the ASCII text format. ASCII is a standard that enables any computer, regardless of its operating system or hardware, to read the text. Typically, to send an email, using a mail software, in the "To" line, the email address of the person to whom a message is being sent is typed in. The sender's email address will usually appear on the "From" line. Using this address, the recipient of the message will be able to respond to the sender. On the "Subject" line, the subject of the message or a very brief summary is typed in. At the bottom of the message is a "signature" area that can contain personalized information about the sender. Some mail programs will automatically append this signature to the bottom of every message that is sent. Signature areas are not required and are used at the discretion of the person who creates the email message, however, they are very popular with email users.

When an email message is sent to someone on the Internet, that message often has to travel through a series of networks before it reaches the recipient. These networks might use different email formats. Gateways perform the job of translating email formats from one network to another so that the messages can make their way through all the networks of the Internet. After the email message is created, it is sent as a stream of packets using the Internet's TCP/IP protocol. Each packet bears the address of the destination. Routers on the Internet look at the addresses in each packet and send the packets on the best path to get there. Many factors go into how the packets are routed, including the traffic volume on different backbones. Each packet may take a different route, so the mail packets may arrive at the destination out of order. When the packets have been received at the receiving address, they are recombined into an email message that the recipient can read.

Using a mailing list, a single message can be sent to a group of people. A mail reflector is a program that runs on an Internet computer and routes mail to members of a mailing list. In a listserver, a user subscribes to a mailing list by sending his/her email address to the listserver. The members then will get every message that everyone sends to the list email address. In another kind of email mailing list a member only receives mail that a single person sends. A user can also subscribe to a mailing list by sending a message to a computer instead of a person. That computer (listserver) reads the email and automatically adds the user to the list of subscribers. The subscriber can unsubscribe from the list in the same way. The mailing list is database of the email addresses of people who have subscribed to it. A user is added to or deleted from the database when the user is subscribed to or unsubscribed from the mailing list.

Mailing lists can be moderated or unmoderated. Messages submitted to a moderated mailing list are screened by the list administrator, who may kill duplicate messages or messages that are not related to the list's theme. An unmoderated mailing list is open, that is, all mail sent to it is automatically sent to everyone on the list.

However, in these typical mailing lists, the group, and the operation of the mailing list, are placed at a higher priority than the needs, or preferences, of the individual member. In most cases the messages are not archived. In one embodiment of the present invention the incoming messages for each discussion community are archived, and these archives are available to the members of the community via a set of web pages. On typical mailing lists the messages are all delivered individually, which can be inconvenient for members who do not check their incoming email very frequently. If there is a daily digest of incoming messages available to members it is exactly that, a daily collection of the messages (including all the header text, signature blocks, quoted text and attached originally messages) It is sent at the same time (usually midnight) to every member who has requested digested messages. This invention, instead, puts the control of the frequency (and timing) of the digests into the hands of the member. Likewise, the members are able to choose the format of the digest, so they can choose to have each message in the digest divested of particular information (for example, header text, signature blocks), and formatted as the members may wish.

After the Internet delivers mail to an email box, a user needs some way to read the mail, compose new mail, and respond to the messages. To do all this, the user uses email software, sometimes called an email client. When someone sends an Internet email message, the message usually isn't delivered straight to the recipient's computer. Instead, it arrive on a mail server. If there is new mail, the recipient sees a list of the new mail messages when the recipient logs into the server. The recipient can chose to have the messages remain on the email server, or download them to their computer.

The email client allows the recipient then to read the message, file it, delete it, or respond to it. Email software also enables users to do things such as create folders for storing mail, search through the messages, keep an address book of other users, create group mailing lists, create and add a signature file, and more. Some email software also read messages that are formatted with Hyper Text Markup Language (HTML), the same format web pages are stored in. When the links in the message are clicked, a web browser will launch and visit the page it is linked to.

When an email message is sent, it is first broken up by the Internet's TCP protocol into IP packets. Those packets are then sent to an internal router that examines the IP address. Based on the address, the router decides whether the packet is sent to someone on the same network or to someone outside the network. If the message goes to someone on the same network, it is delivered to them. If the mail is addressed to someone outside the network, it might have to pass through a "firewall." A firewall is a computer that shields the network from external networks (e.g., Internet) so intruders cannot access the internal network. The firewall watches messages and data going into and out of the network, to and from the Internet. It can also prevent certain packets from getting through it.

Once out on the Internet, the message is sent to an Internet router. This router examines the address, determines where the message should be sent, and then sends the message on its way. A gateway at the receiving network gets the email message. Typically, this gateway uses TCP to reconstruct the IP packets into a full message. The gateway then translates the message into the protocol the target network uses and allows it in. The message may also be required to pass through a firewall on the receiving network. The receiving network examines the email address and sends the message to a specific mailbox.

In on embodiment, the system of the present invention utilizes a Secure Socket Layer (SSL) connection between the user's web browser and the web servers, to display the messages in the archive for the community. Privacy is a significant concern on the Internet, and this allows the members of a discussion community to make sure they are the only people viewing their archives. Similarly, there is an embodiment of the present invention that includes encryption (via Pretty Good Privacy, a current encryption standard on the Internet) on both the incoming messages and outgoing digests. This ensures the privacy of the discussion community, and that the incoming messages are from the members of the community and not some other Internet user masquerading as one.

One of the most contentious issues to surface on the Internet in the last few years has to do with what Internet users call "Spam." Spam is unsolicited email that commercial companies or individuals send out, asking the recipients to buy their goods and services. It is the Internet equivalent of junk mail. At times the Spam may contain inducements to visit the seller's site.

Spam may initially seem like a minor annoyance, but it can cause major problems. Spam floods the Internet with unwanted mail, which can lead to delayed or lost mail. It clogs the Internet pipeline, making other information slower to send. It wastes time for those who have to go through their inboxes deleting unsolicited mail, especially if they pay for their email service by the hour. Additionally, it is fairly common for Spammers to hide their real email addresses by forging other people's names onto the From or Sender header of an email message. This makes it difficult for Webmasters and mail administrators to filter Spam messages by From address or domain name.

Some email software allow the user to filter out messages from certain addresses. When any email from those addresses is received, the email software blocks it. This feature is referred to as a "Spam filter.". Whenever a user receives Spam, the address of the unwanted mail can be added into the Spam filter and the future email messages from that address are blocked. However, Spam filters don't always work because Spammers often change their addresses and forge the From, Sender, and Reply fields in an email header. Some online services let their members block email from any address the members specify. In essence, a Spam filter for those who use that particular online service. Some Internet Service Providers (ISPs) also block Spam.

USENET, the world's largest collection of electronic discussion forums, provides a way for messages to be sent among computers across the Internet. People from all over the world participate in discussions on thousands of topics in specific areas of interest called "newsgroups." There are many different major hierarchies of newsgroups, such as recreation (identified by the letters "rec") and computers (identified by the letters "comp"). Within these major hierarchies are subcategories (such as rec.arts) and further subcategories (such as rec.arts.books). Individual newsgroups can cover anything from movies to parenting, ecology, sports teams, clip art, and news about Usenet itself. Not all ISPs carry all newsgroups. An administrator at each service decides which newsgroups to carry.

To participate in newsgroups, a user needs special software to read and respond to them. Some newsgroup readers let the user view the ongoing discussions as threads. "Threads" are topics within the continous conversations. For example, in the "rec.arts.books" newsgroup there may be many different threads going on at one time, each discussing a different book.

There are moderated and unmoderated newsgroups. In a moderated newsgroup, each message goes to a human moderator. The moderator looks at the messages, making sure they are appropriate for the group. If they are appropriate, the messages are posted. All messages sent to an unmoderated newsgroup are automatically posted. When messages are posted, Usenet servers distribute them to other sites that carry the newsgroup. A site usually carries only the most current messages, otherwise, they would soon run out of storage space. However, some sites archive or store old discussions for future retrieval if needed.

Usenet is useful, and a good resource for many people. However, in relation to this invention it has a number of drawbacks. A user is reliant on their system administrator to allow the proper news groups to be hosted on the user's news server (for example, they may want to join alt.lifestyle.buried, which the system administrator may have decided not to include). Since the invention, as described, can be delivered to the user via the usual protocols for Internet email and web browsing, it is no additional load to a system administrator so it is unlikely that it will be made unavailable to a user.

Usenet news groups are not easy to create. In order for a group to become available globally, the Usenet administration has to be contacted. They need a petition of a certain number of users that are interested in the topic, and after a period of review they will add the group to the news group structure. The new group then propagates around the Internet to the thousands of different news group servers. As mentioned above, the new group is not truly global because at any one of those servers a system administrator may decide to ignore the new group. Using the system and method of the present invention, as described, it is possible to instantly create a group much smaller than the Usenet administration would probably approve. For example, three mothers with a common interest to coordinate and discuss Thursday afternoon soccer classes can form a discussion group using the system and method of the present invention.

Few minutes on the web pages described as part of the present invention and the group would be active and available globally.

News groups had a huge decrease in popularity when the message traffic started becoming inundated with advertising messages sent in by people not genuinely interested in the content of the news group. The invention, as described, blocks any email from users not yet members of the discussion community.

Furthermore, news groups require another software application, a news reader, running on the user's computer. The majority of the users on the Internet have become comfortable with their email client and their web browser, but do not use their news reader. Since the invention, as described, uses email and web pages to communicate with the members of the community (and to create the community), it is unaffected by this limitation.

One of the immediate ways to communicate with others via the Internet is to participate in live "chat." A number of ways are available to chat on the Internet, but one of the most popular ones is called Internet Relay Chat (IRC). Every day, many people all over the world hold conversations on many topics via IRC. Each different topic is called a "channel." Channels reside on different servers around the world. Some servers have only a few channels, and others have many of them. IRC follows a client/server model.

The IRC client communicates with an IRC server on the Internet. Users log onto a server using the client and pick a channel on which they want to chat. When they type words on the keyboard, the words are sent to the server. The server is part of a global IRC server network. The server sends the message to other servers, which in turn, send the messages to people who are part of that particular channel. They can then see and respond to the message.

Users can chat on the Internet in other ways, as well. Many Web sites, for example, use proprietary chat software that doesn't use the IRC protocol, but enables the users to chat when they are on the site. Another kind of chat is called "instant messaging." In instant messaging, users communicate privately, one-on-one, with another person. Users can create special lists so that they are informed when their counter parts come online ready to chat, and the counter parts are also informed when the users come online. The problem with chat sites and instant messaging is that it is live, meaning the users have to be at their terminals to send or receive messages. However, the system of the present invention provides the look and feel of a conversational text. While the conversational text is not live, it has a selectable frequency for sending the digests. Therefore, the users do not have to be present all the time at their terminals to receive messages and can collect, read and reply to their messages at their convenience.

FIG. 2 depicts a flow diagram of a computer program executed by one or more of the servers 222a–222m for one embodiment of the present invention. The computer program generates, applies, and maintains a plurality of electronic communities for exchanging email between the members and has several features that keep the discussion continuous. In block 20, a group community is created. In one embodiment of the present invention, the group community is created by accessing a web site on one or more of servers 222a–222m. An example of this creation process is depicted in FIGS. 7–11 and described in the following paragraphs.

Figure 7:
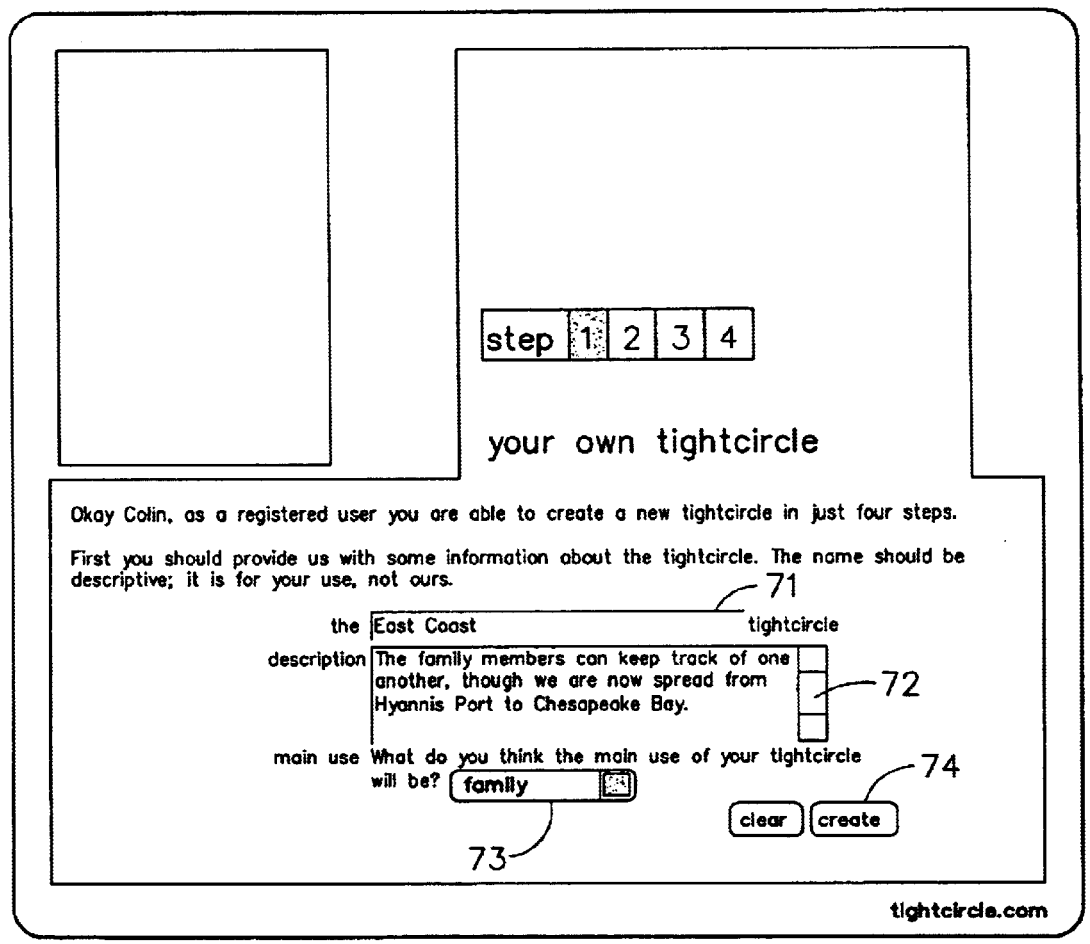

As shown in FIG. 7 a user fills in a form on a web page, supplying the name she wishes to assign to her community (block 71 on the form), a short description of the community (block 72), and a use that she believes the community will be fulfilling (choice 73). Once the user has filled in this information she presses the "create" button 74 which submits the form to the web server. Once the form is submitted to the servers 222a–222m the necessary entries are created in the relational databases (described in more detail below) and the user is shown the next step in the creation process.

The next step is primarily a chance to approve the email address assigned to the community. As illustrated in FIG. 8, the web pages now presented to the user include the name of her community 80 and that the user has a chance to see the email address the system has assigned 85, and has a place to put in her own choice 81 (the user would then press the request button 83). If the user thought the supplied email address was acceptable, she would just press the continue button 84. This is also the step where she would decide if this discussion is moderated, and if it is, she would click on the moderated checkbox 82 on the form before pressing the continue button 84.

Figure 9:
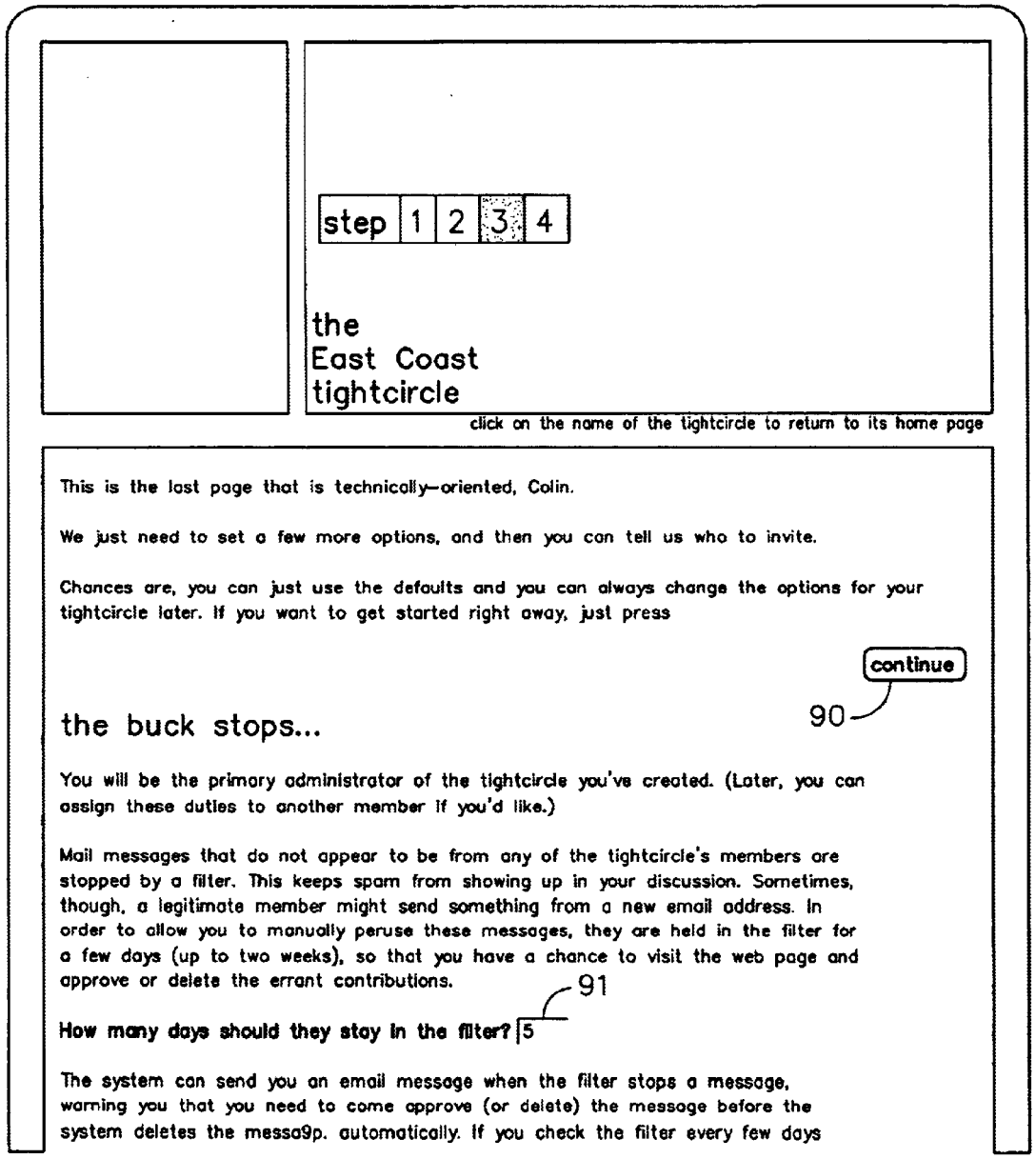
Figure 10:
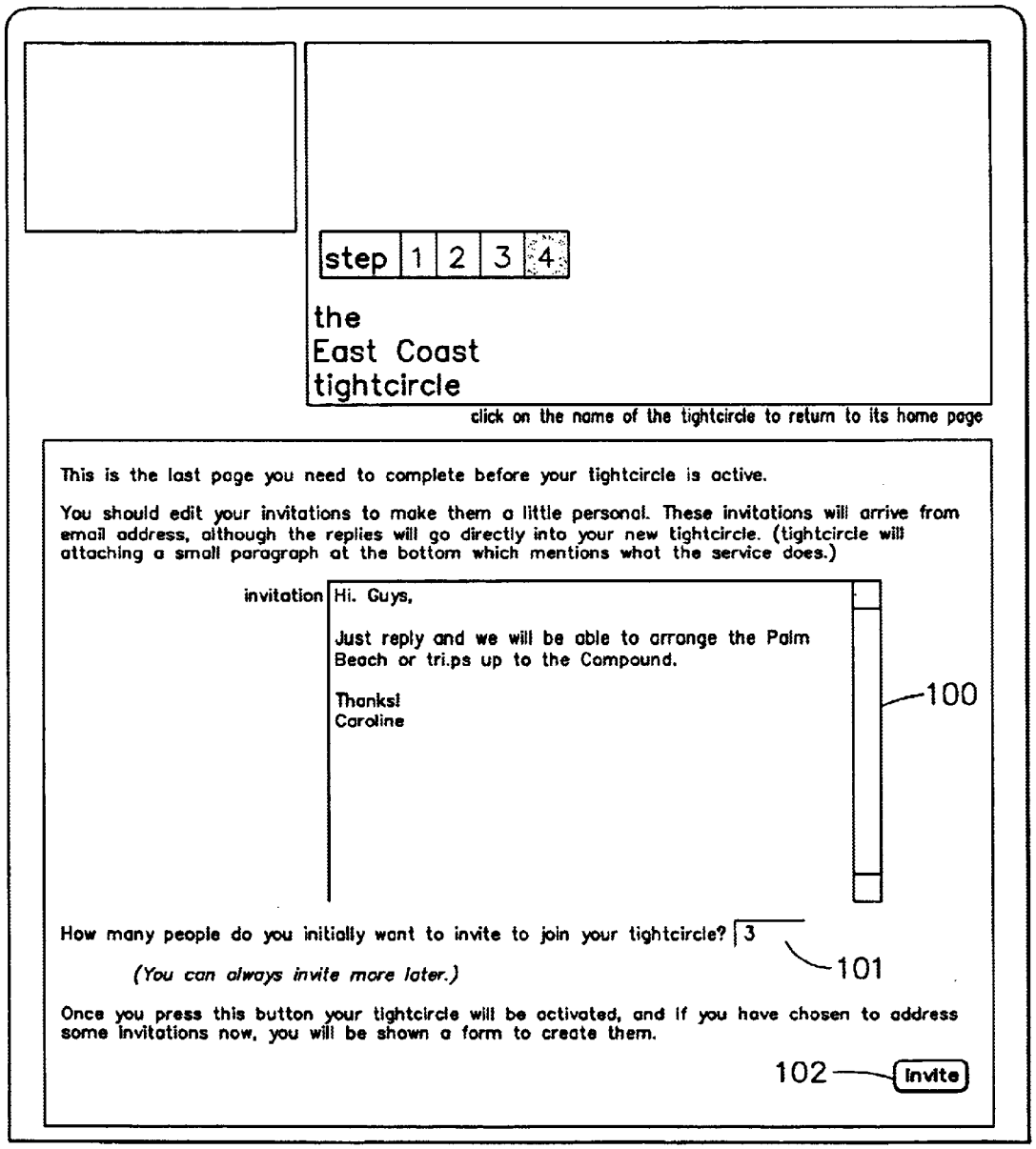

FIG. 9 shows the next step in creating a discussion group in one embodiment of the present invention, where the user selects the number of days that misdirected messages stay in the archive for her (or another community member assign administrative duties) to approve it for distribution to the community. The user would fill in the number of days on this form in space 91 and press the continue button 90. In the next step, shown in FIG. 10, the creator of the community writes the invitation 100, and picks the number of members to invite (initially) in space 101. Then she presses the invite button 102. More members can be subsequently invited at different times.

FIG. 11 shows the last step for creating the community. The user creating the community types in the first name in space 110, last name in space 111, email address in space 112, and nickname in space 113 for each of the community members that are to be invited. When the invite button 114 is pressed this form is submitted to the servers 222a–222m and the members are sent invitations to join the community (in this embodiment they need to respond to these invitations in order to activate their memberships). Once the members are invited the community discussion is active. Messages sent to the community's email address (coast@tightcircle.com in this example) are stored in the archive and, eventually, digested for distribution to the members.

In another embodiment, the group community may be created by sending an email or making a telephone call, including the related information for the group and its members, to a system administrator. The system administrator then sets up the group community on a server using the related information.

Based on the user-supplied name for the community, and subject to user's approval, the system then assigns the community an email address which all of the members write to. In block 21, the system stores a list of the group members in a database residing on one or more of servers 222a–222m. In one embodiment there are several databases that reference one another. This is a standard relational database model. One database contains the information about the users, their email addresses (Internet users often have more than one email address), a log of their activity, their password to access the services of a web pages, and their full name. Another database contains the information about each community, the name, the email address members write to, a log of the activity in the discussion of this community, and whether the community is active or not. A third database contains references to both of these databases, so that it can show which communities a user is a member of. This makes it possible (and easy) for one user to be a member of several communities. The members may then address email messages to the community (using the supplied email address), instead of individually addressing each member, as shown in block 22.

In block 23, email messages sent to the community are received by the system. The system then sorts through the received email messages to find the originating address, as shown in block 24. In block 25, the system matches the originating address with the entries in the name list stored in the database. The system then replaces the typically long (and illegible) email address of the originator with his or her nickname. In block 26, the email messages are digested, so that rather than getting a number of separate messages, each member gets a group of the messages at a predetermined frequency set by the user who had set up the group community (community leader). The digested messages would read like a conversation, except that the participants are writing email messages back and forth. These digested messages are simpler to read than a number of individual email messages.

FIGS. 5A–5E illustrate an example of how "raw" email messages are digested based on the community information database 33C and user profile database 33A. In this example, John, Ted, Carolyn and Ed belong to a community called coast at a web site called tightcircle. As the community leader, Carolyn sets up the community configuration and membership at the tightcircle web site. The system assigns the community an email address which all of the members write to (coast@tightcircle.com in this example). An example of the content of this database is shown in FIG. 5A. As shown in FIG. 5A, possible incoming mail addresses are linked with the member's nickname and the assigned email address for a community. This is one possible schema for implementing this relational database, and the salient feature is that given an incoming message, it is possible to determine which member is writing in, and to which discussion community.

Examples of incoming email messages for the community are shown in FIGS. 5B–5D. As shown in FIGS. 5B–5D, the original email messages are cluttered with headers, quoted material, and signature blocks. The system determines that these messages are addressed to the community that Carolyn has created. The system sorts through the rest of the headers to find the originating address and matches the originating address with the entries in the community information database. In the digest, the system then simply displays "Ted" instead of Ted's full email address of "ussenatormass@senate.gov." This is done, in part, to simplify the format of the digest and make it more user-friendly.

The system stores the valid messages in a database, marking them to show which member was the author of each message. Although, Ed has not contributed any messages to the community yet, he, along with all members of the coast community, would receive a digest from coast@tightcircle.com that is shown in FIG. 5E. This digest is formatted to look like a conversation. The conversation includes more than two people at a time and does not happen real time. Because email messages from the various members are grouped together into one digest, there is a feeling of continuity, community and conversation.

How often a digest is compiled and sent out, and what format it is generated in, are decisions which typically the community members or the community leader make. In one embodiment, using data provided by the community leader, the messages addressed to the community are filtered and added selectively to a message archive. Next, according to rules decided by each individual community member or the community leader, the messages are retrieved from the archive, selectively formatted, and compiled into a digest form that is sent to the community members.

Figure 3:
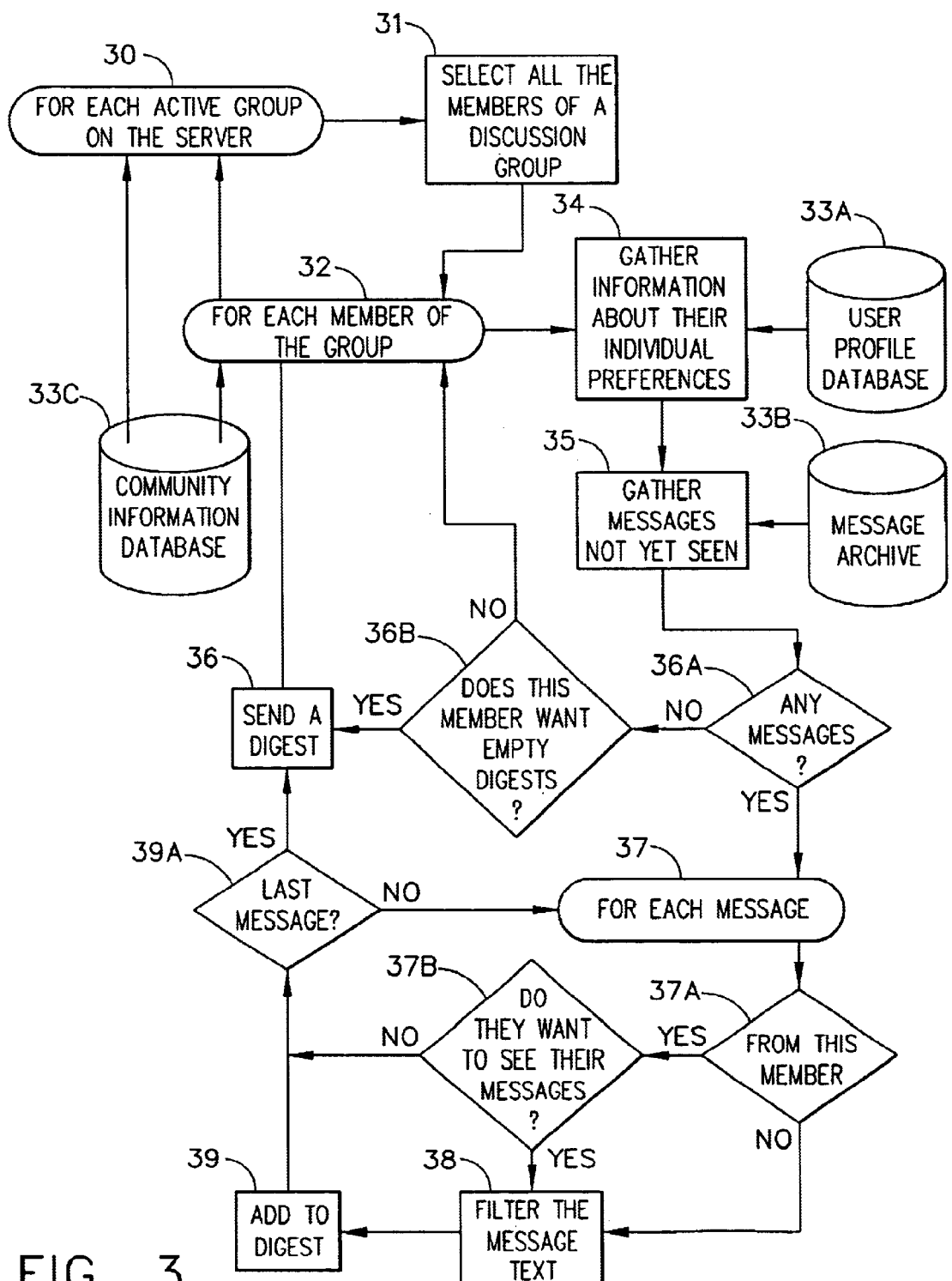
FIG. 3 is an exemplary flow diagram for message digesting and formatting for one embodiment of the present invention.

FIG. 3 is an exemplary flow diagram for message digesting and formatting for one embodiment of the present invention. For each active community group, all the members of the group are selected, as shown in blocks 30 and 31 respectively. For each group member, information about their preferences are gathered from user profile database 33A as indicated by blocks 32 and 34 respectively. User preferences may include how often the digests are sent, which email address the digests should be sent to (some users have several, which can each be valid for sending messages into the discussion), whether the user wishes to have the digests sent to them as email messages or instead read them on a web page, whether the users wishes to receive HTML content, whether the user wishes to receive attachments (graphics files, other multimedia files or documents), and what margin the digest should be formatted for, to name a few.

The community information such as which groups are active which users are in each group is stored in community information database 33C. In block 35, the messages not yet seen by members are gathered from message archive 33B. If there are no messages which the member has not already seen, there is no need for the system to continue digesting, as shown by decision block 36A. If there are no messages, the member preferences are consulted, as shown in decision block 36B. It is possible that this member wants to see empty digests (usually as a reminder that the system is still operating but there are no new messages), so the system can send one as shown in block 36. In either case, the next member of the group is selected in block 32.

Incoming messages are stored initially, not distributed. Subsequent actions are taken on the messages in their original form in the archive. By holding the messages before distribution, the invention significantly increases the usefulness of an email discussion group because it allows many other features to be implemented. As shown in blocks 37 and 37A respectively, for each message, the system checks to determine whether the message is from this specific member. This is because many community members may wish to not include their own messages in their digests. They have already seen them, and some people do not enjoy reading their own words. Bandwidth may also be an issue, and if a user has written a message and sent it into the community discussion there is not much reason to have it returned to her with the messages from the rest of the community. Decision block 37B shows this choice affecting the handling of a single message.

Once it is determined that the message is going to be added to the digest, the message text is filtered and the message is added to the digest as shown by blocks 38 and 39 respectively. If this message is the last message, the completed digest is sent out, as shown by decision block 39A and block 36 respectively. If the message is not the last message, the next message is considered, as shown by blocks 39A and 37 respectively.

Figure 4:
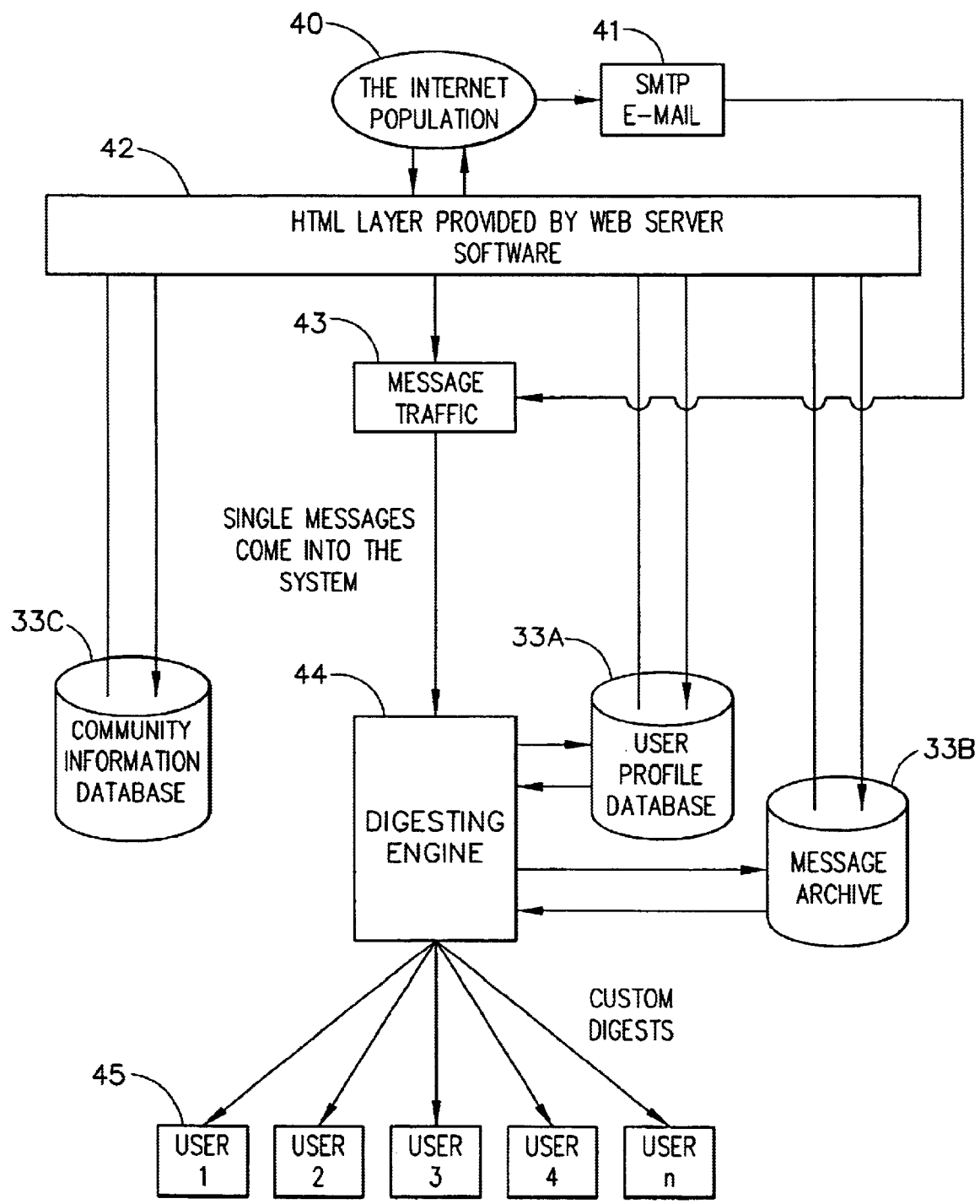
FIG. 4 is one embodiment of the system for implementing the flow diagram of FIG. 3.

FIG. 4 is one embodiment of the system for implementing the flow diagram of FIG. 3. FIG. 4 depicts the interaction of the population of Internet users 40 with the system described for one embodiment of the present invention. The servers 222A–222M interact with this population via either incoming email 41 or by web pages. The web pages are referred to as an HTML layer 42, which presents the HTML text exchanged by web servers and the users' web browsers. By referencing the data in the various databases 33A–33C, the web servers are able to present web pages to the users that contain messages from the archive, or a list of members of a particular community, or a form for submitting a message to a discussion.

In one embodiment each community is assigned a home page on the web site so members can share information such as postal addresses, phone numbers, birthday wish lists, favorite movies, photographs, and other data private to the community. Messages arriving in the system either via Internet mail 41 or via forms in the HTML layer 42 are gathered by the system into a single message traffic flow 43 of individual messages. According to information in the databases 33A–33C, the system accepts the message, or rejects it with a note to the author. Accepting the message stores the message in the message archive 33B. The digest engine described above is running continuously. It gathers information about the communities 33C, the preferences of each individual member 33A, and looks at the archive of messages 33B. It can create customized digests for each member when they wish to get them, and send them out individually 45.

Figure 6:
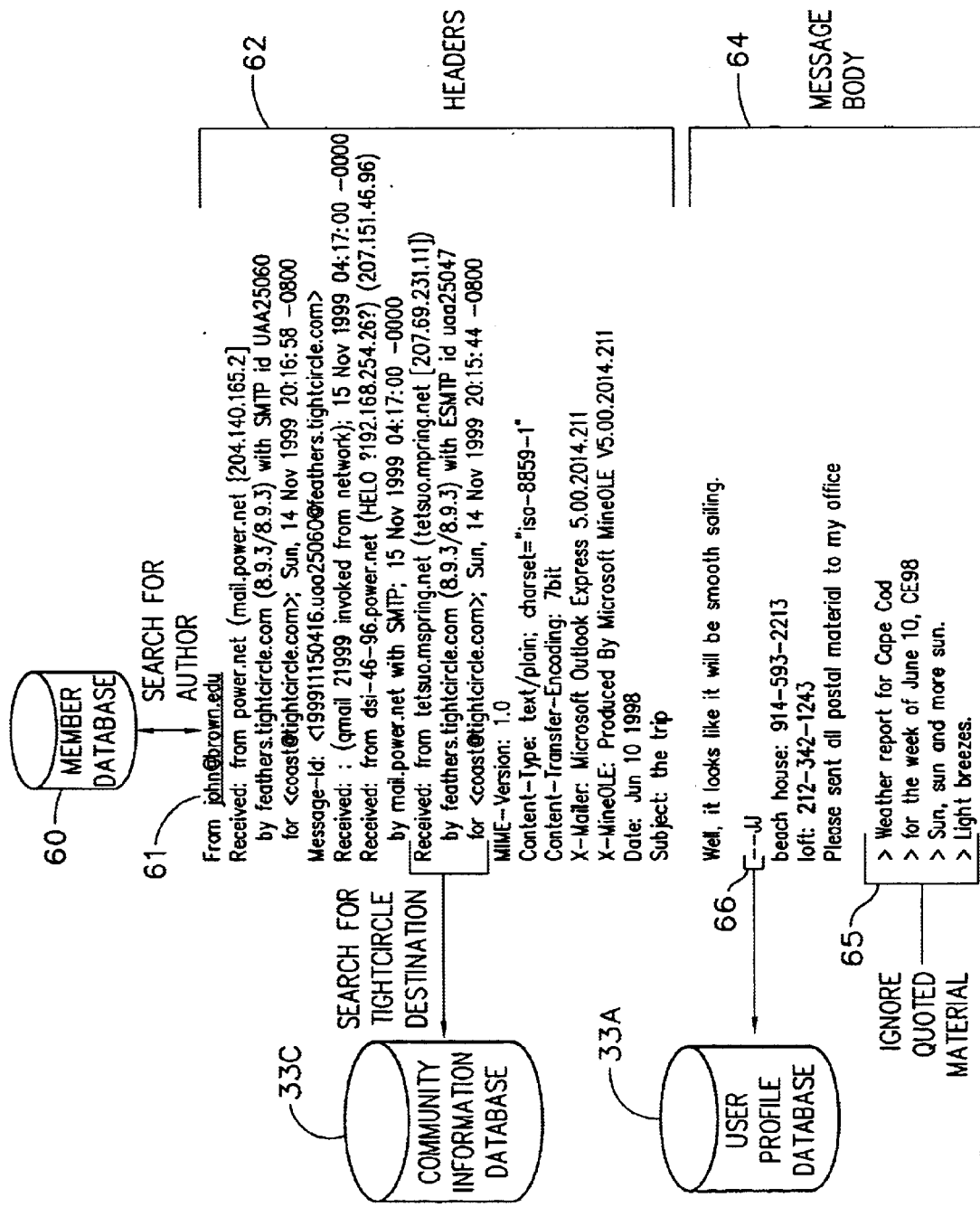
FIG. 6 is an example of an email message.

FIG. 6 is an example of a complete email message as it would be found on the mail servers, with headers, message body, originator (author) address, destination address, quoted material, signature field, etc. The author's full email address 61 appears on top as the first line of the message header 62. These header lines 62 include a destination address 63 and are followed by message body 64. Typically message body 64 includes author's signature 66 and often some quoted text 65, usually from previous messages.

When the system receives an email addressed to a community, it searches the member database 60 for the author's address 61. When this message is displayed in a digest, the system replaces the author's full email address 61 with the author's nickname stored in the member database 60. This has several advantages. First, the lengthy email address is replaced by a more personable nickname. Second, if any community member has several email addresses, the other members do not need to keep track of these addresses being the same person. The system also finds the destination community 63 and searches the community information database 33C to identify that this user is a member of this community. This keeps Spam from showing up in the digests.

Additionally, the system consults the user profile database 33C and finds whether this member has a signature that they always use (this is supplied by the user, entered in one embodiment of the invention, on a web page). If there is such a signature line, the message text is searched to locate it. Text that follows this line, and this line itself, are ignored when the message is digested. Quoted material is also removed, so that the conversational tone of the text in the digests is not disrupted by a block of text from a previous digest. In one embodiment, this text is not removed except when the message is added to a digest. This is during the step in block 38 of FIG. 3. The complete message is stored in the archive. Removal of the header text and quoted material speeds up the email discussion and provides a feeling of continuity and conversation. The material in a signature block is usually redundant and is information which would be stored in the member's record for this community in the membership database any way.

Digests can be scheduled for each individual community member so that members who check their mail often can have the digest sent often, and members who check their mail less frequently, are sent digests less frequently. The format of the digest determines which pieces of information are displayed. It may not be necessary, in all cases, to see what time a message was sent, just the date that it was sent. By selecting the format, the community member can decide to view the date and not the time. Being able to select the format also means that the digests can be formatted to match the device they are being displayed on. For example, a member who receives the digests on a large monitor in an HTML-enabled email client would most likely select the HTML digest which may include hyperlinks to the web site that produced the digest. Another member who reads the mail on a palm computing device can select a plain text digest format with a narrow margin.

In one embodiment, messages originating from addresses not in the list of member addresses are stored in a database for a selectable limited period of time and the administrator for a community (Carolyn in the above example) can look through them and decide if some of the'stored messages are from members, but from addresses not currently recorded for those users. The original form of the individual message is stored in an archive database, so that all the information is kept intact. If subsequently, a community member wishes to have a message re-sent to them in a different format, they can do so by retrieving the original message from the archive database. Furthermore, members can peruse and search the information stored in the archive database.

In one embodiment, there are hyperlinks to a web site within the digest formats delivered in HTML. These hyperlinks allow additional information about the community and its members to be delivered to other members. For example, while reading a digest, a community member may click on another member's name and view a web page which displays the other member's email address, full name, the data of the last message they wrote, their favorite songs and television shows, their birthday, and any other information stored in the member database 60 about them. The system of the present invention is also capable of translating email from or to a foreign language using the conventional language translation software. Additionally, the system is able to deliver email to members as voice mail, fax, or graphics or sound files using the usual software solutions.

Although particular embodiments of the invention have been described in detail, it should be appreciated that numerous modifications, variations, and adaptations may be made without departing from the scope of the invention as defined in the claims.

What is claimed is:

1. A method for delivering digested electronic mail (email) messages to members of a community group, the method comprising the steps of:
   (a) storing in a database information about the members of the community group;
   (b) receiving an email addressed to the community group;
   (c) sorting through the email to find a destination community address;
   (d) matching the destination community address with the stored information in the database to find the community;
   (e) storing the email;
   (f) creating a digest of the email for each group member; and
   (g) delivering the digested email to the group members.

2. The method of claim 1 further comprising the step of blocking an email that is not from a group member.

3. The method of claim 1 further comprising the step of archiving the email in its original form.

4. The method of claim 3 wherein, the step of archiving comprises the step of marking the email to show the author of each email.

5. The method of claim 4 further comprising the step of searching the email archive.

6. The method of claim 1 further comprising the step of formatting the digested email.

7. The method of claim 6 wherein, the step of formatting comprises the step of formatting the digested email based on user preferences stored in a database.

8. The method of claim 7 wherein, the user preferences are specified over the Internet.

9. The method of claim 7 wherein, the user preferences are specified by email.

10. The method of claim 1 further comprising the step of assigning a homepage to the community group for sharing information between the group members.

11. The method of claim 1 wherein, the step of delivering comprises the step of delivering the digested email to each group member based on a predetermined frequency.

12. The method of claim 11 wherein, the predetermined frequency is selectable by each group member.

13. The method of claim 1 further comprising the step of creating the community group by accessing a web site and entering the information for the community group and its members.

14. The method of claim 13 further comprising the step of assigning the community group an email address.

15. The method of claim 1 further comprising the step of creating the community group by sending an email and including the information for the community group and its members.

16. The method of claim 1 further comprising the step of creating the community group by placing a phone call and disclosing the information for the community group and its members.

17. The method of claim 1, wherein the step of creating the digest of the email for each group member includes the steps of determining an author's name based on a sender's email address retrieved from the email and replacing the sender's email address with the author's name in the digest.

18. The method of claim 1, wherein the step of creating the digest of the email for each group member includes the step of filtering the email to retrieve message body information.

19. The method of claim 1, wherein the step of creating the digest of the email for each group member includes the step of deleting all quoted material.

20. The method of claim 1, wherein the step of creating the digest of the email for each group member includes the step of deleting all signature blocks.

21. The method of claim 1, wherein the step of creating the digest of the email for each group member includes the step of deleting all header text.

22. The method of claim 1, wherein the step of creating the digest of the email for each group member includes the step of deleting all materials for the respective group member in the digest.

23. A computer system coupled to a computer network for delivering digested electronic mail (email) messages to members of a community group comprising:

(a) a database for storing information about the members of the community group;

(b) means for receiving an email addressed to the community group;

(c) means for sorting through the email to find a destination community address;

(d) means for matching the destination community address with the stored information in the database to find the community;

(e) a storage medium for storing the email;

(f) means for creating a digest of the email for each group member; and (g) means for delivering the digested email to the group members.

24. The computer system of claim 23 further comprising means for blocking an email that is not from a group member.

25. The computer system of claim 23 further comprising means for archiving the email in its original form.

26. The computer system of claim 25 further comprising means for searching the email archive.

27. The computer system of claim 23 further comprising means for formatting the digested email.

28. The computer system of claim 27 wherein, means for formatting comprises means for formatting the digested email based on user preferences stored in a database.

29. The computer system of claim 28 wherein, the user preferences are specified over Internet.

30. The computer system of claim 28 wherein, the user preferences are specified by email.

31. The computer system of claim 23 further comprising means for assigning a homepage to the community group to share information between the group members.

32. The computer system of claim 23 wherein, means for delivering comprises means for delivering the digested email to each group member based on a predetermined frequency.

33. The computer system of claim 32 wherein, the predetermined frequency is selectable by each group member.

34. The computer system of claim 23 further comprising means for creating the community group through a web site and entering the related information for the community group and its members.

35. The computer system of claim 23 further comprising means for creating the community group by an email and including the related information for the community group and its members.

36. A computer readable medium having stored thereon a set of instructions including instructions for delivering digested electronic mail (email) messages to members of a community group, the instructions, when executed by a computer, cause the computer to perform the steps of:

(a) storing in a database information about the members of the community group;

(b) receiving an email addressed to the community group;

(c) sorting through the email to find a destination community address;

(d) matching the destination community address with the stored information in the database to find the community;

(e) storing the email;

(f) creating a digest of the email for each group member; and (g) delivering the digested email to the group members.

* * * * *